(12) United States Patent
Zhang

(10) Patent No.: US 11,640,224 B2
(45) Date of Patent: May 2, 2023

(54) PROCESSING METHOD AND DEVICE

(71) Applicant: Lenovo (Beijing) Limited, Beijing (CN)

(72) Inventor: Ya Zhang, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 0 days.

(21) Appl. No.: 17/475,124

(22) Filed: Sep. 14, 2021

(65) Prior Publication Data
US 2022/0206667 A1 Jun. 30, 2022

(30) Foreign Application Priority Data
Dec. 31, 2020 (CN) .......................... 202011630051.4

(51) Int. Cl.
*G06F 3/04812* (2022.01)
*G06F 3/04845* (2022.01)
*G06F 3/14* (2006.01)
*G06F 3/0354* (2013.01)

(52) U.S. Cl.
CPC ...... *G06F 3/04812* (2013.01); *G06F 3/04845* (2013.01); *G06F 3/1446* (2013.01); *G06F 3/03543* (2013.01)

(58) Field of Classification Search
None
See application file for complete search history.

(56) References Cited

U.S. PATENT DOCUMENTS

| | | | | |
|---|---|---|---|---|
| 6,018,340 A * | 1/2000 | Butler | ................... | G06F 3/1423 715/764 |
| 2006/0033712 A1* | 2/2006 | Baudisch | .............. | G06F 3/1446 345/157 |
| 2009/0027302 A1* | 1/2009 | Li | ......................... | G06F 3/1454 345/1.1 |
| 2016/0378295 A1* | 12/2016 | Cousins | ................ | G06F 3/1423 715/702 |

FOREIGN PATENT DOCUMENTS

| | | |
|---|---|---|
| CN | 104656944 A | 5/2015 |
| CN | 110806847 A | 2/2020 |
| CN | 110837331 A | 2/2020 |

* cited by examiner

*Primary Examiner* — Stella Higgs
(74) *Attorney, Agent, or Firm* — Anova Law Group, PLLC

(57) ABSTRACT

The present disclosure provides a processing method. The method includes outputting first content in a first display area of a first display device, the first content including an identification object, the edge of the first area being an edge area between the first display area and a second display area of a second display device; receiving a movement instruction for moving the identification object from the first display area to the second display area; and moving the identification object from a first position in the first display area to a second position in the second display area in response to the movement instruction, the first position being a position on the edge of the first area.

10 Claims, 15 Drawing Sheets

PROCESSING METHOD AND DEVICE

CROSS-REFERENCES TO RELATED APPLICATION

This application claims priority to Chinese Patent Application No. 202011630051.4, filed on Dec. 31, 2020, the entire content of which is incorporated herein by reference.

FIELD OF TECHNOLOGY

The present disclosure relates to the technical field of display control technology and, more specifically, to a processing method and device.

BACKGROUND

When multiple display screens are being used in the operating system, there may be cases where the cursor cannot be moved from one screen to another. For example, different resolutions of two adjacent screens can prevent the cursor movements between adjacent screens.

BRIEF SUMMARY OF THE DISCLOSURE

One aspect of the present disclosure provides a processing method for displaying an identification object. The method includes outputting first content in a first display area of a first display device, the first content including an identification object located on an edge of a first area of the first display area, the first area having a first resolution, the edge of the first area being an edge area between the first display area and a second display area of a second display device; receiving a movement instruction for moving the identification object from the first display area to the second display area, wherein the second display area has a second resolution and the first resolution is higher than the second resolution, the first display device outputs a first part of a target image in the first display area, the second display area outputs a second part of the target image in the second display area, and the first part and the second part are at least partially adjacent in the target image; and moving the identification object from a first position in the first display area to a second position in the second display area in response to the movement instruction, the first position being a position on the edge of the first area.

Another aspect of the present disclosure provides a processing device for displaying an identification object. The device includes a content output unit configured to output first content in a first display area of a first display device, the first content including an identification object located on an edge of a first area of the first display area, the first area having a first resolution, the edge of the first area being an edge area between the first display area and a second display area of a second display device; an instruction acquisition unit configured to receive a movement instruction, the movement instruction for moving the identification object from the first display area to the second display area, wherein the second display area has a second resolution and the first resolution is higher than the second resolution, the first display device outputs a first part of a target image in the first display area, the second display area outputs a second part of the target image in the second display area, and the first part and the second part are at least partially adjacent in the target image; and to an historical activity area of the touch operation based on the operation information; and an identification object control unit configured to move the identification object from a first position in the first display area to a second position in the second display area in response to the movement instruction, the first position being a position on the edge of the first area.

Another aspect of the present disclosure provides an electronic device for displaying an identification object. The electronic device includes a first display device, the first display device having a first display area; and a processor configured to output first content in the first display area, the first content including an identification object located on an edge of a first area of the first display area, the first area having a first resolution, the edge of the first area being an edge area between the first display area and a second display area of a second display device; receive a movement instruction, the movement instruction for moving the identification object from the first display area to the second display area, wherein the second display area has a second resolution and the first resolution is higher than the second resolution, the first display device outputs a first part of a target image in the first display area, the second display area outputs a second part of the target image in the second display area, and the first part and the second part are at least partially adjacent in the target image; and to an historical activity area of the touch operation based on the operation information; and move the identification object from a first position in the first display area to a second position in the second display area in response to the movement instruction, the first position being a position on the edge of the first area.

BRIEF DESCRIPTION OF THE DRAWINGS

In order to more clearly illustrate technical solutions in embodiments of the present disclosure, drawings for describing the embodiments are briefly introduced below. Obviously, the drawings described hereinafter are only some embodiments of the present disclosure, and it is possible for those ordinarily skilled in the art to derive other drawings from such drawings without creative effort.

DETAILED DESCRIPTION

Technical solutions of the present disclosure will be described in detail with reference to the drawings. It will be appreciated that the described embodiments represent some, rather than all, of the embodiments of the present disclosure. Other embodiments conceived or derived by those having ordinary skills in the art based on the described embodiments without inventive efforts should fall within the scope of the present disclosure.

Figure 1:
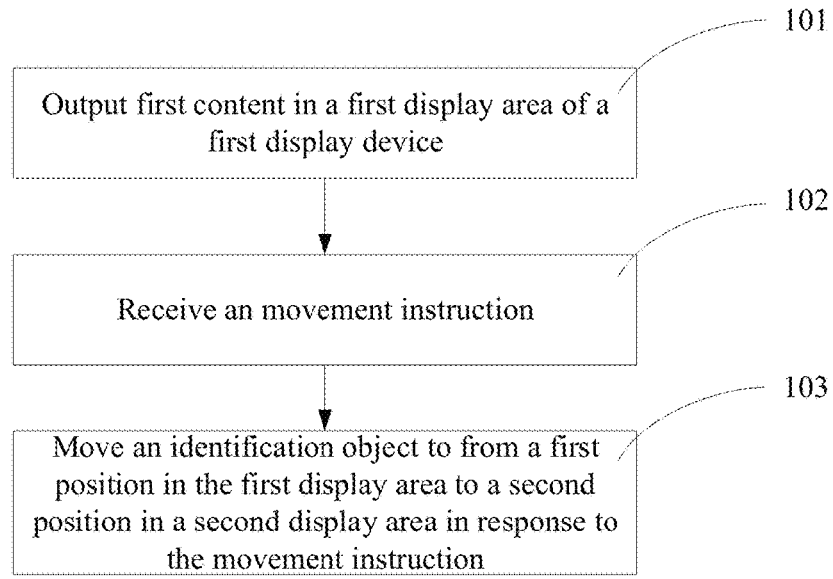
FIG. 1 is a flowchart of a processing method according to an embodiment of the present disclosure.

Referring to FIG. 1, which is a flowchart of a processing method according to an embodiment of the present disclosure. The method is suitable for electronic devices capable of outputting content and controlling identification objects, such as tablets, laptops, and other devices with display devices such as display screens. The technical solutions provided in the embodiments of the present disclosure can be used to realize the output of the identification object across display devices. The method will be described in detail below.

101, outputting first content in a first display area of a first display device.

Figure 2:
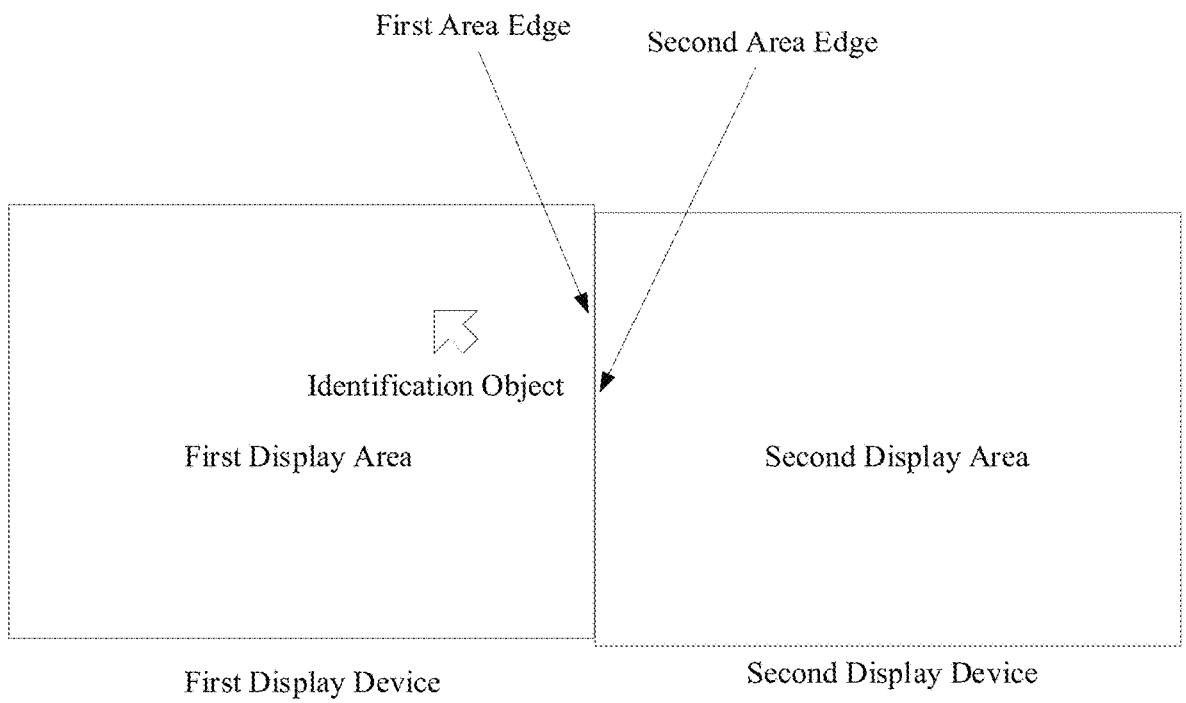
FIGS. 2-4, 5A-5B, and 6-12 are diagrams of an identification object moving between a first display area and a second display area according to some embodiments of the present disclosure.

In some embodiments, the first display device may be a device with a display area such as a display screen or a projection screen. The first content may include at least an identification object, and the identification object may be an object that can indicate a current operating position, such as a mouse or a cursor. In one embodiment, the identification object may be positioned on the edge of the first area of the first display area, and the edge of the first area may be an edge of an area between the first display area and a second display area on a second display device. As shown in FIG. 2, the edge of the first area is the edge area in the first display area and between the first display area and the second display area. At the same time, the edge of the second area in the second display area is between the first display area and the second display area. In this embodiment, the identification object that needs to be moved is positioned at the edge of the first area of the first display area.

102, receiving a movement instruction.

In some embodiments, the movement instruction can be used to control the movement of the identification object from the first display area to the second display area. More specifically, the movement instruction can be used to control the identification object to move from the edge of the first area in the first display area to the second display area. It should be noted that the second display area may be a display area in the moving direction of the identification object moving from the first display area.

It should be noted that the first display area may have a first resolution, the second display area of the second display device may have a second resolution, and the first resolution may be higher than the second resolution. In some embodiments, the resolution in the embodiments of the present disclosure may also be indicated by high and low, which indicates the relative value of between the first resolution and the second resolution, that is, the first resolution may be higher than the second resolution. In other words, the high or low resolution in the embodiments of the present disclosure is in relative terms. For example, compared with the second display area, the first display area may be a high-resolution display area, and compared with the first display area, the second display area may be a low-resolution display area. Based on this, in some embodiments, the identification object needs to be controlled to move between the display areas with different resolutions. More specifically, the movement of the identification object needs to be controlled to move from the high-resolution display area to the low-resolution display area. Of course, the identification object can also be controlled to move from the low-resolution display area to the high-resolution display area.

Figure 3:
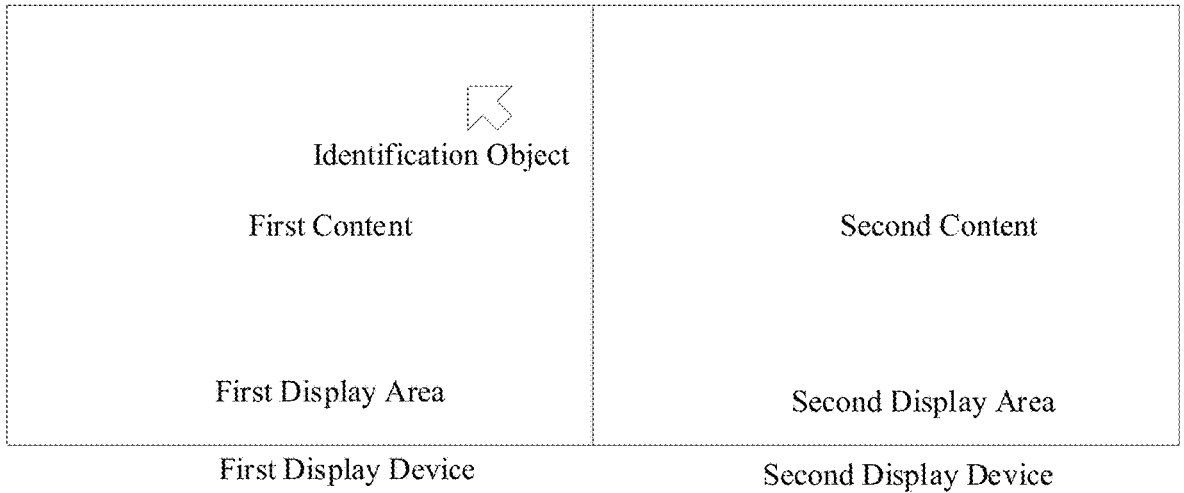

In some embodiments, the first display device and the second display device may be different display devices, and the second display device may be a device with a display area such as a display screen or a projection screen. For example, the first electronic device may be equipped with a first display device, such as a computer with a display screen. The first display device may be configured to output the first content in its first display area. The second electronic device may be equipped with a second display device, such as a projector with a projection screen, etc., and the second display device may be configured to output second content in its second display area. As shown in FIG. 3, the first electronic device and the second electronic device are different devices, and each electronic device outputs content on its display area.

It should be noted that the second display device may be a device that can realize mirror display or extended display with the first display device. In application scenarios where the first display device and the second display device (or even other display devices) are used to achieve extended dual-screen display (or extended multi-screen display), the first display area in the first display device and the second display area in the second display device can achieve logical association in the output content. More specifically, the first display device may be configured to output a first part of a target image in the first display area, and the second display device may be configured to output a second part of the target image in the second display area. The first part and the second part may be at least partially adjacent in the target image. There may be adjacent areas between the first display area and the second display area, and the adjacent areas may be logically connected areas in the extended display. Of course, there may also be non-adjacent areas between the first display area and the second display area. These non-adjacent areas may be logically disconnected areas in the extended display. That is, the first display area and the second display area may be spliced into one display area through the adjacent areas. Of course, display areas of additional display devices may also be spliced together, and the spliced display area can be used to output the same target image. At this time, the partial image of the target image may be displayed in the first display area, the partial image of the target image may also be displayed in the second display area, and the partial images displayed by the spliced adjacent first display area and the second display area may be at least partially adjacent to each other.

More specifically, the first content output in the first display area may be the first part of the target image, and the first content output in the second display area may be the second part of the target image. In addition, the first content and the second content may be at least partially adjacent to each other. For example, there may be at least some pixel contents adjacent to the first content and the second content.

Of course, in other embodiments, the first content output in the first display area may not have a direct relationship with the second content output in the second display area. For example, the pixel content between the first content and the second content may be unrelated. That is, in practical applications, although the content output between the first display area and the second display area are unrelated, logical association between the first display area and the second display area may be established as needed. For example, the first display area and the second display area may each output a background desktop. Although the background desktops of the two display areas are unrelated, the first display area and the second display area can be spliced together when there is a need to output the same content such as the target image.

Figure 4:
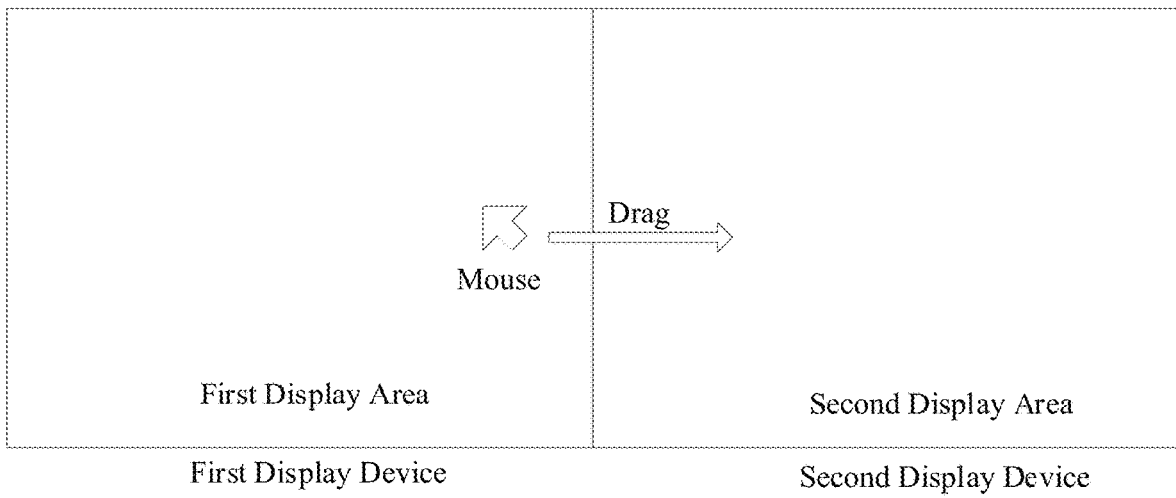

More specifically, the movement instruction in the embodiments of the present disclosure can be generated when the identification object is subjected to a movement input operation, for example, when the user drags the mouse to move from the first display area to the second display area. As shown in FIG. 4, a movement instruction is generated when the electronic device receives an input operation of dragging the mouse by the user. In this embodiment, the movement instruction can be obtained to control the identification object, such as a mouse, to move from the first display area to the second display area.

S103, controlling the identification object to move from a first position in the first display area to a second position in the second display area in response to the movement instruction.

The first position may be any position in the first display area, such as any position on the edge of the first area on the first display area.

In this embodiment, by responding to the movement instruction, the identification object can be controlled to move from any position on the edge of the first area in the first display area with high resolution to the second position in the second display area with low resolution, thereby realizing the cross-area movement of the identification object from the high-resolution display area to the low-resolution display area.

For example, after receiving the movement instruction for controlling the movement of the mouse, the mouse can be controlled to move from any position in the high-resolution laptop display screen to the low-resolution projection screen, thereby avoiding the situation that the mouse cannot move around the display areas.

In addition, after the movement instruction for controlling the movement of the identification object from the second display area to the first display area is obtained, the electronic device may also respond to the movement instruction, and control the identification object to move from any position in the low-resolution second display area to the first display area, thereby realizing the cross-area movement of the identification object between the display areas with different resolutions. For example, after receiving a movement instruction for controlling the movement of the mouse, the mouse can be controlled to move from any position in the low-resolution laptop display screen to the high-resolution display.

Consistent with the present disclosure, the first display area and the second display area can respectively output a part of the target image. After the first content is outputted in the first display area of the first display device and the movement instruction for moving the identification object in the first content is obtained, the identification object can be controlled to move from any position in the first display area with high resolution to the second display area with low resolution, thereby avoiding the situation that the identification object cannot move from the high-resolution display area to the low-resolution display area.

In some embodiments, in application scenarios where the first display area and the second display area are spliced together into one display area in order to output the same target image (i.e., the extended dual-screen display), there may be cases where the edge of the adjacent areas between the first display area and the second display area are not aligned, causing the area edges of one of the display areas and the other display area to have non-adjacent partial edges.

Figure 5A:
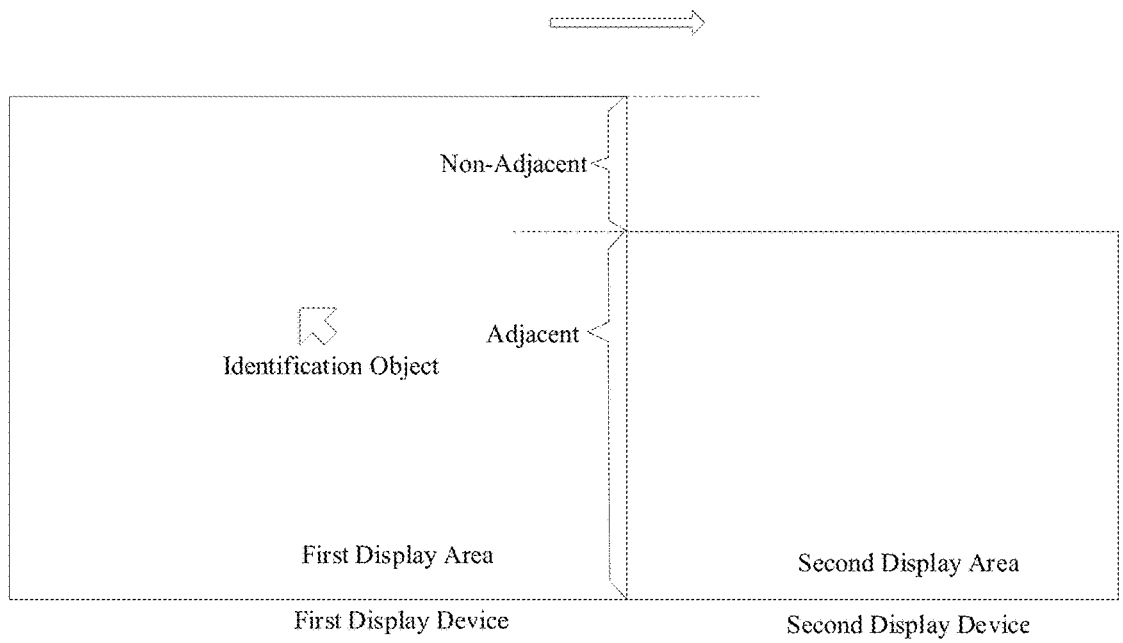
Figure 5B:
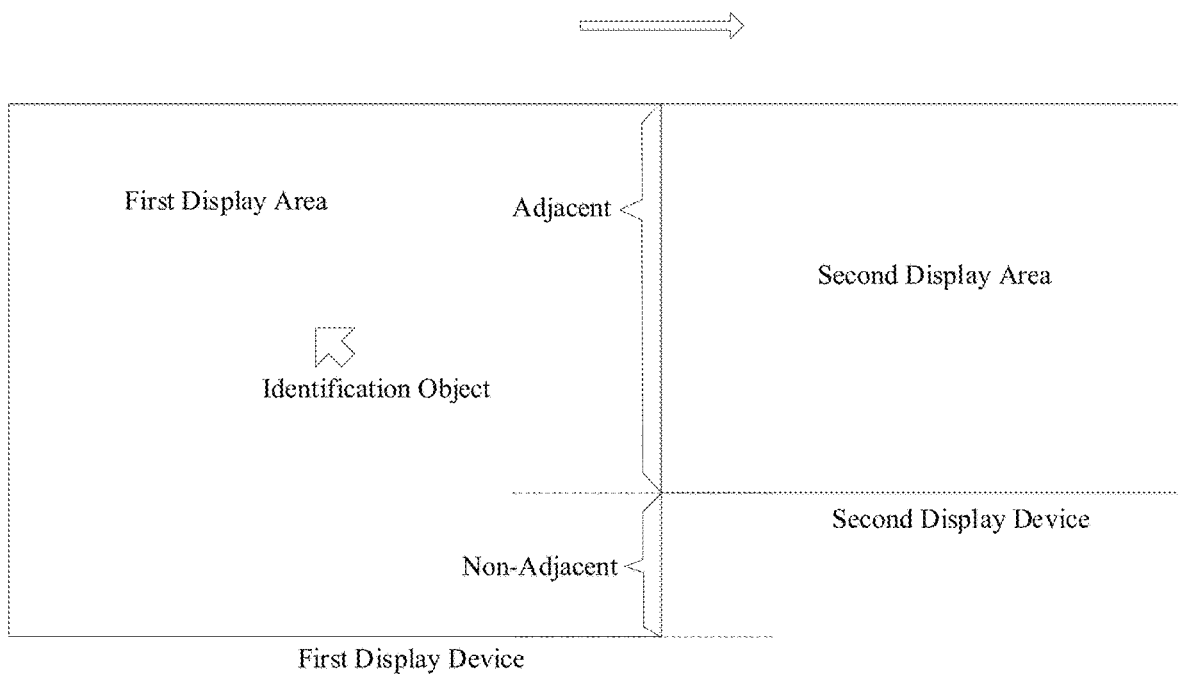

For example, some of the edges of the first area of the first display area may not be adjacent to the second display area. As shown in FIG. 5A and FIG. 5B, some edges of the first display area are adjacent to the second display area. The term "adjacent" here may indicate that when the first display area and the second display area each output the same target image, the content of the pixels output by the first display area and the second display area on the edge area are adjacent.

It should be noted that FIG. 5A and FIG. 5B are application scenarios where the first display area and the second display area are aligned with respect to the upper end or the lower end in the horizontal direction, resulting in the non-adjacent edges. Of course, there may also be application scenarios where the first display area and the second display area are aligned with respect to the left end or the right end in the vertical direction, resulting in the non-adjacent edges, which will not be described in detail here.

Figure 6:
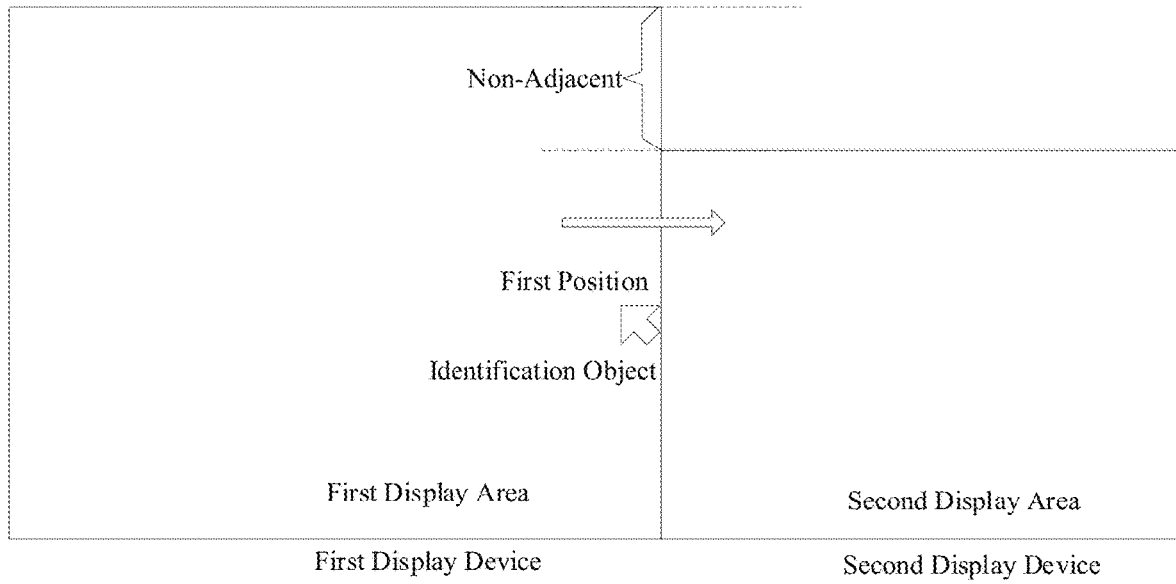

In some embodiments, the first position of the identification object on the edge of the first area of the first display area may be any position on the edge of the first area of the first display area where there is an adjacent position in the second display area. As shown in FIG. 6, the first position can be any position adjacent to the second display area on the edge of the first area.

Therefore, after receiving the movement instruction and responding to the movement instruction, the identification object can be controlled to move from any position adjacent to the second display area on the edge of the first area in the first display area with high resolution to the second position in the second display area with low resolution. The second position may be a position in the second display area in the moving direction of the identification object on the first display area, thereby realizing the cross-area movement of the identification object from the edge position adjacent to the second display area on the first display area with high resolution to the second display area with low resolution.

For example, when the mouse is on the laptop display screen adjacent to the display area of the projection screen, after receiving the movement instruction for controlling the movement of the mouse, the mouse can be controlled to move from the position adjacent to the projection screen on the high-resolution laptop screen to the low-resolution projection screen.

Figure 7:
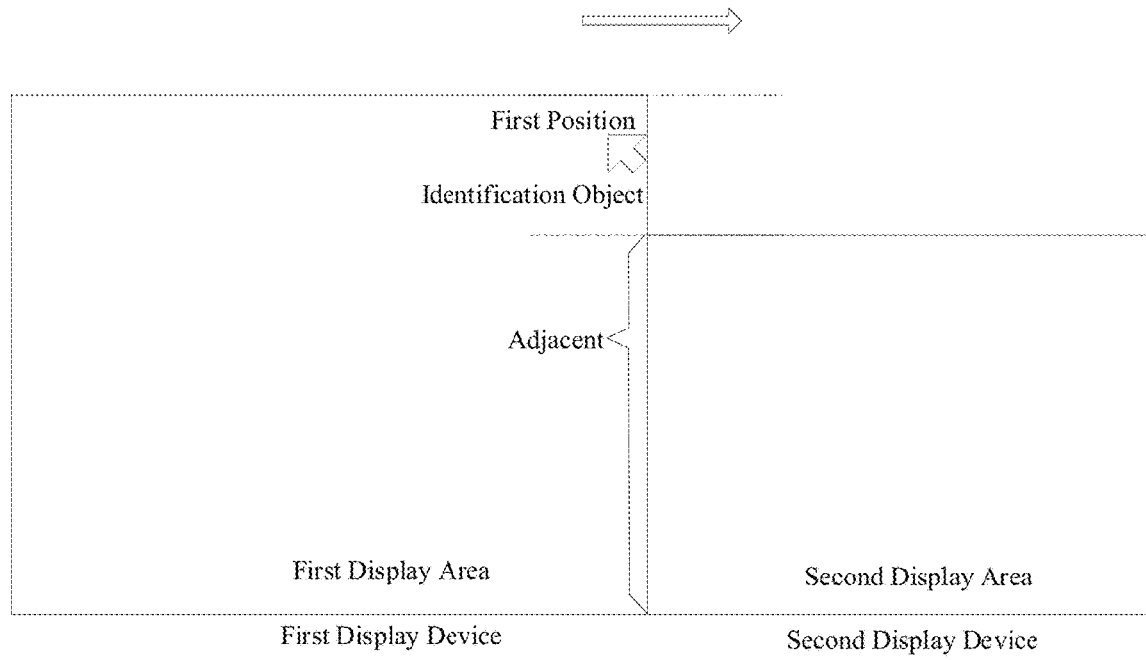

In some embodiments, the first position of the identification object on the edge of the first area of the first display area may be any position on the edge of the first area of the first display area where there is no adjacent position in the second display area. As shown in FIG. 7, the first position can be any position on the edge of the first area that is not adjacent to the second display area.

In this case, after receiving the movement instruction and responding to the movement instruction, the identification object can be controlled to move from any position on the edge of the first area in the first display area with high resolution that is not adjacent to the second display area to the second position in the second display area with low resolution, thereby realizing the cross-area movement of the identification object from the edge position of the high-resolution first display area that is not adjacent to the second display area to the low-resolution second display area.

For example, when the mouse is on a position on the laptop display screen that is not adjacent to the display area of the projection screen, after receiving the movement instruction for controlling the movement of the mouse, the mouse can be controlled to move from a position not adjacent to the projection screen on the high-resolution laptop display screen to the low-resolution projection screen, thereby avoiding the situation where the mouse cannot be moved across areas on the edges of the non-adjacent areas.

In addition, when controlling the identification object to move from the second display area to the first display area, if the position of the identification object on the edge of the second area of the second display area is any position on the edge of the second area of the second display area where there is an adjacent position in the first display area, after receiving the movement instruction for controlling the movement of the identification object from the second display area to the first display area, the identification object may be controlled to move from any position adjacent to the first display area on the edge of the second area in the second display area with low resolution to a position in the first display area with high resolution, thereby realizing the cross-area movement of the identification object from the edge position adjacent to the second display area on the first display area with low resolution to the first display area with high resolution.

For example, when the mouse is on a laptop display screen adjacent to the display area of a monitor, after receiving the movement instruction for controlling the movement of the mouse, the mouse can be controlled to move from the position adjacent to the laptop display screen with low resolution to the monitor with high resolution.

In some embodiments, if the position of the identification object on the edge of the second area of the second display area is any position on the edge of the second area of the second display area where there is no adjacent position in the first display area, after receiving the movement instruction and responding to the identification object, the identification object may be controlled to move from any position on the edge of the second area in the second display area with low resolution that is not adjacent to the first display area to a position in the first display area with high resolution, thereby realizing the cross-area movement of the identification object from the edge position of the second display area with low resolution that is not adjacent to the first display area to the first display area with high resolution.

For example, when the mouse is in a position on the laptop display screen that is not adjacent to the display area of the monitor, after receiving the movement instruction for controlling the movement of the mouse, the mouse can be controlled to move from a position not adjacent to the monitor on the laptop display screen with low resolution to the monitor with high resolution, thereby avoiding the situation where the mouse cannot be moved across areas on the edges of the non-adjacent areas.

It should be noted that the first position may be a position on the edge of the first area of the first display area, and the first position may be understood as the end position of the movement trajectory of the identification object on the first display area. In addition, the second position may be a position on the edge of the second area of the second display, and the second position may also be understood as the starting position of the movement trajectory of the identification object on the second display area.

Based on the first position, a variety of processing methods may be used to obtain the second position.

In some embodiments, when the first position is any position on the edge area in the first display area where there is an adjacent position in the second display area, the second position may be obtained by performing a first processing on the first position.

Figure 8:
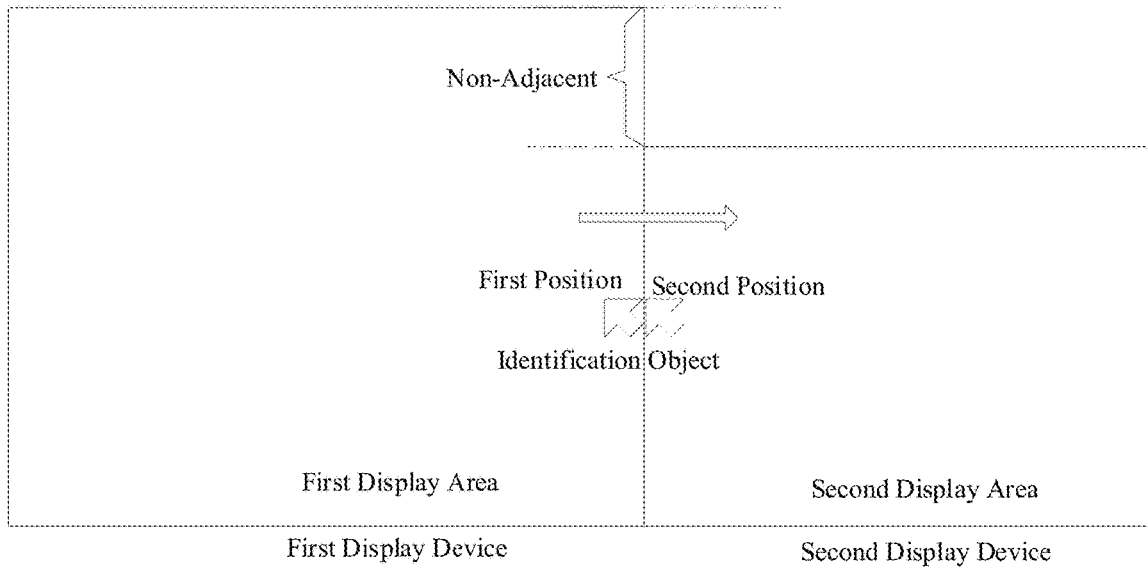

More specifically, obtaining the second position by processing the first position may include obtaining the second position adjacent to the first position on the edge area in the second display area. For example, a position (i.e., the second position) adjacent to the first position on the edge of the second area between the first display area in the second display area is the second position can be identified. As shown in FIG. 8, the first position is the position on the edge of the first area of the first display area where there is an adjacent position in the second display area, which can be understood as the end position of the movement trajectory of the identification object on the first display area. The second position obtained through the first processing may be the position adjacent to the first position on the edge of the second area of the second display area, which can be understood as the starting point of the movement trajectory of the identification object on the second display area. In this way, in response to the movement instruction, the identification object can be controlled to move from the first position to the second position, and the identification object can be moved across the screen from the high-resolution display area to the low-resolution display area. At this time, the movement trajectory of the identification object between the first display area and the second display area may be continuous.

For example, when the mouse is on the laptop display screen adjacent to the projection screen, in response to a movement instruction, the mouse can be controlled to move from the edge position of the laptop display screen to the projection screen to the edge position on the projection screen adjacent to the laptop display screen. At this time, the end position of the mouse movement on the laptop display screen may be adjacent to the starting point of the mouse movement on the projection screen, and the movement trajectory between the laptop display screen and the projection screen may be continuous.

In other embodiments, when the first position is any position on the edge area in the first display area where there is no adjacent position in the second display area, the second position may be obtained by performing a second processing on the first position, where the second processing may be a different processing method from the first processing. That is, the second position in the second display area can be obtained by using different processing methods when the first position is a position adjacent to the second display area on the edge of the first area of the first display area, and when the first position is a position not adjacent to the second display area on the edge of the first area of the first display area.

In some embodiments, performing the second processing on the first position to obtain the second position may include obtaining the second position on the edge area in the second display area, the second position being a position on the edge area in the second display area that is closest to the first position, or, the second position being a position of the edge vertex corresponding to the first position on the edge area of the second display area.

Figure 9:
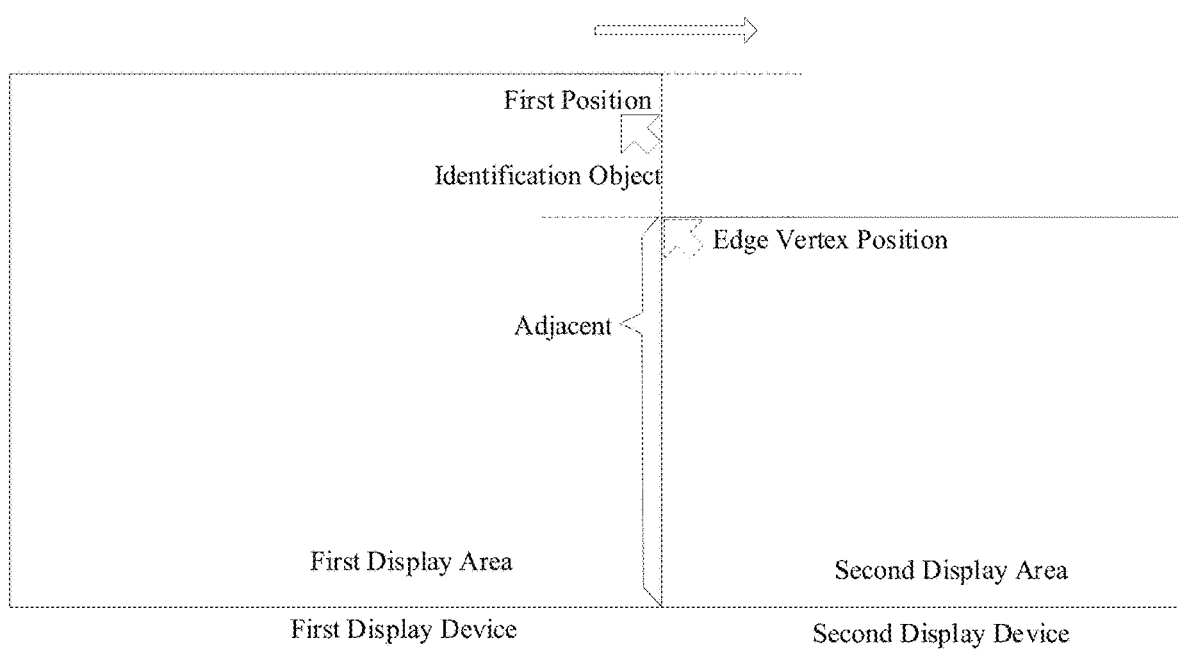
Figure 10:
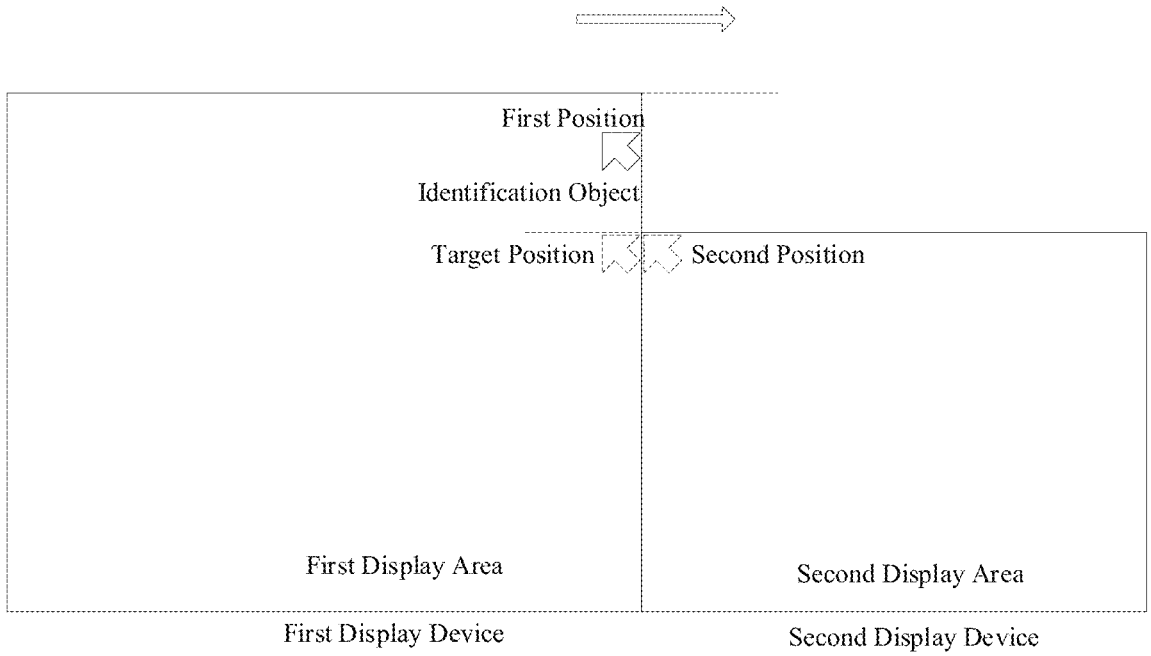

In some embodiments, the second position may be preset of obtained by searching. For example, when the first position is any position on the edge area in the first display area where there is no adjacent position in the second display area, the second position corresponding to the first position may be preset. The second position can be preset to be the position closest to the first position on the edge of the second area in the second display area or, as shown in FIG. 9, the second position is preset as the edge vertex position corresponding to the first position on the edge of the second area in the second display area. In another example, a plurality of positions adjacent to the second display area on the edge of the first area in the first display area may be obtained first. Subsequently, as shown in FIG. 10, a target position with the shortest distance from the first position can be obtained from the plurality of positions, then the second position adjacent to the target position in the edge of the second area in the second display area can be obtained. In this way, in response to the movement instruction, the identification object can be controlled to move from the first position to the second position, and the identification object can be moved across the screen from the high-resolution display area to the low-resolution display area. At this time, the movement trajectory of the identification object between the first display area and the second display area may not be continuous.

For example, when the mouse is on a position not adjacent to the projection screen on the laptop display screen, in response to a movement instruction, the mouse can be controlled to move from the first position on the laptop display screen that is not adjacent to the projection screen to the edge vertex position closest to the first position on the edge of the projection screen adjacent to the laptop display screen. At this time, the end position of the mouse on the laptop display screen may not be adjacent to the starting position of the mouse on the projection screen, that is, the movement trajectory of the mouse between the laptop display screen and the projection screen may be discontinuous.

In other embodiments, regardless of whether the first position has an adjacent position in the second display area, the second position may be obtained by using the same method. At this time, the second position may be a position on the edge of the second area adjacent to the first display area in the second display area, and the relative positional relationship of the second position on the edge of the second area may be consistent with the relative positional relationship of the first position on the edge of the first area. At this time, the second position may be a position adjacent to the first display area on the edge of the second area, or a position not adjacent to the first display area on the edge of the second area.

Figure 11:
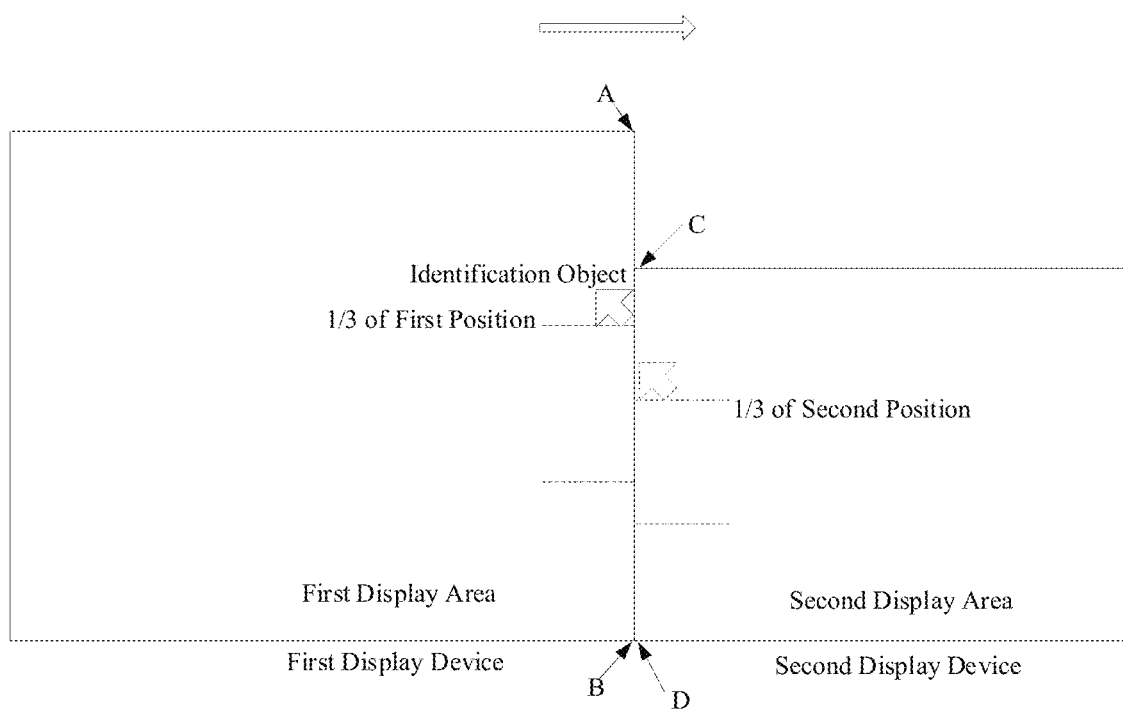

In some embodiments, the relative positional relationship of the first position on the edge of the first area may be obtained by calculating the relative positional relationship between the edge vertices of the first position on the edge of the first area. For example, the first position may be ⅓ from point A to point B on the edge of the first area. Based on the relative positional relationship, the second position on the edge of the second area adjacent to the edge of the first area on the second display area may be identified, and the second position may have the same relative positional relationship with the edge of the second area. For example, as shown in FIG. 11, the second position is on the edge of the second area with a relative positional relationship of ⅓ from point C to point D. That is, when controlling the movement of the identification object from the first display area with high resolution to the second display area with low resolution, based on the relative positional relationship of the identification object on the edge of the first area of the first display area, the corresponding position on the edge of the second area of the first display area in the same proportion can be identified.

For example, when the left part of the target image is outputted on the first display area, the right part of the target image is outputted on the second display area, and the edge of the first area of the first display area and the edge of the second area of the second display area are adjacent in the output pixel content. In order to make the movement of the identification object correlate with the image content at the corresponding position, when the identification object is controlled to move from the first display area to the second display area, based on the relative positional relationship of the identification object on the edge of the first area of the first display area, the corresponding position on the edge of the second area of the first display area in the same proportion may be identified. In this way, when the identification object moves form the left part of the image to the right part of the image, the first position and the second position before and after the movement may be adjacent in the image pixel content.

Figure 12:
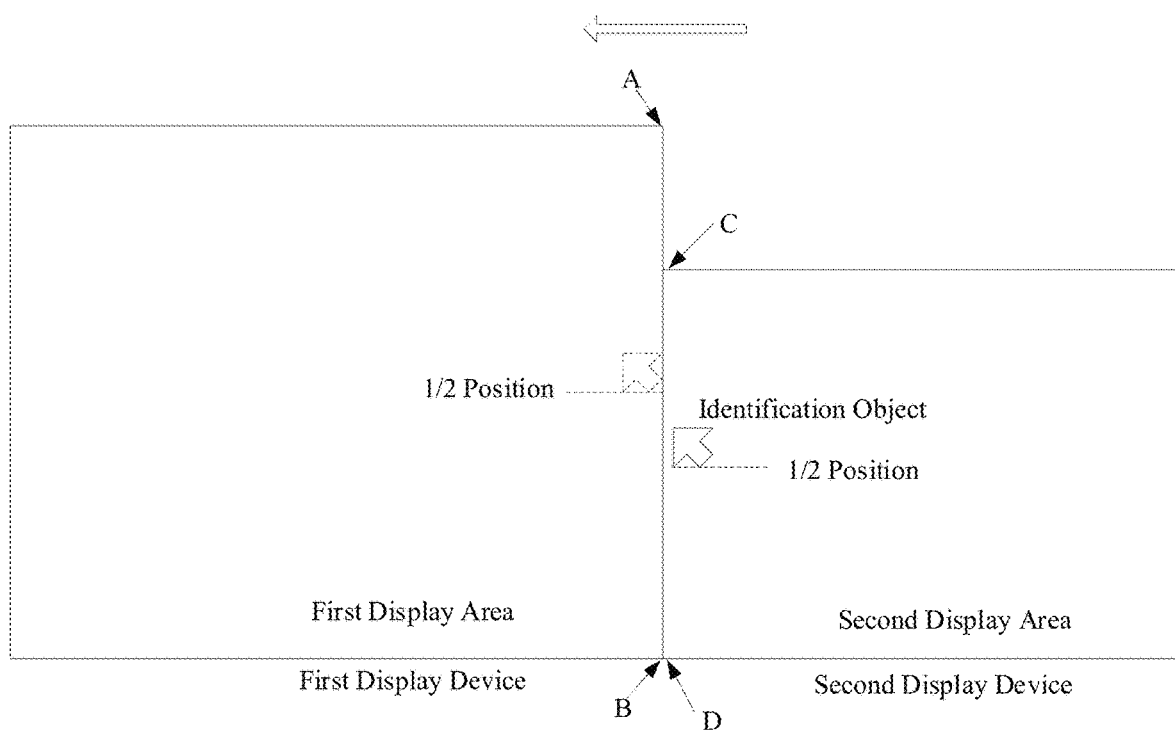

Similarly, when controlling the movement of the identification object from the low-resolution second display area to the high-resolution first display area, the corresponding position on the edge of the first area of the first display area in the same proportion may be identified based on the relative positional relationship of the identification object on the edge of the second area of the second display area. As shown in FIG. 12, the identification object is at ½ position on the edge of the second area from point C to point D. Based on the relative positional relationship, the second position which has the same relative positional relationship with the edge of the first area can be identified on the edge of the first area adjacent to the edge of the second area on the first display area. That is, the position on the edge of the first area with a relative positional relationship of ½ from point A to point B, that is, the position of the identification object after the movement, can be identified.

Figure 13:
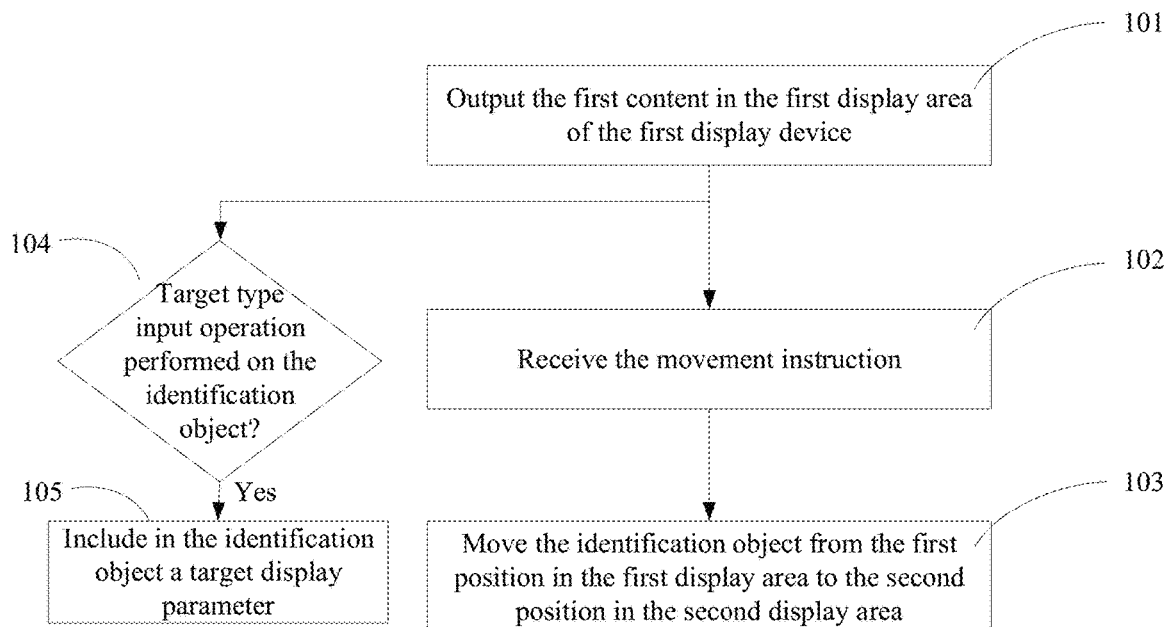
FIG. 13 is a flowchart of the processing method according to an embodiment of the present disclosure.

In practical applications, while controlling the movement of the identification object between different display areas, continuous input monitoring may also be performed on the identification object output in the first content. As shown in FIG. 13, after the first content is outputted in the first display area of the first display device in the process at 101, the method may further include the following processes.

104, monitoring whether a target type input operation is performed on the identification object, and proceeding to the process at 105 if the target type input operation is performed on a target object.

In some embodiments, the target type input operation may be understood as a plurality of specific types of input operations, and these target type input operations can realize the corresponding functions. More specifically, in the embodiments of the present disclosure, the input operation for the identification object received on the electronic device can be monitored to monitor whether the target type input operation is performed on the identification object. If the target type input operation is performed on the target object, the process at 105 can be performed.

105, controlling the identification object to have at least a target display parameter.

In some embodiments, the target display parameter may be used to prominently indicate the output identification object, thereby reminding the user of the electronic device of the current state of the identification object, such as the current position, the execution state, etc.

In some embodiments, the target display parameter may include one or more of a display size parameter, a display color parameter, and a display shape parameter. In some embodiments, the display size parameter may be a preset parameter that is different from the size parameter of the identification object before the target type input operation is performed, such as an increased size value, etc. The display color parameter may be a preset parameter that is different from the color parameter of the identification object before the target type input operation is performed, such as red, yellow, etc. The display shape parameter may be a preset parameter that is different from the shape parameter of the identification object before the target type input operation is performed, such as a circular or square parameter that is distinguished from a triangle. In this way, when the target type input operation is performed on the target object, the identification object can be controlled to have the target display parameter, which distinguishes the presented display parameter of the identification object when the target type input operation is not performed. For example, the identification object can be controlled to be output in the form of an enlarged red circle, thereby achieving the purpose of prominently outputting the identification object to remind the user of the electronic device.

In addition, the identification object may also include have other parameters, such that the identification object can be further prominently output to the user of the electronic device.

In some embodiments, the target type input operation may be an operation of moving the identification object from the first display area to the second display area, such that at least the identification object can be output at the second position with the target display parameter.

Figure 14:
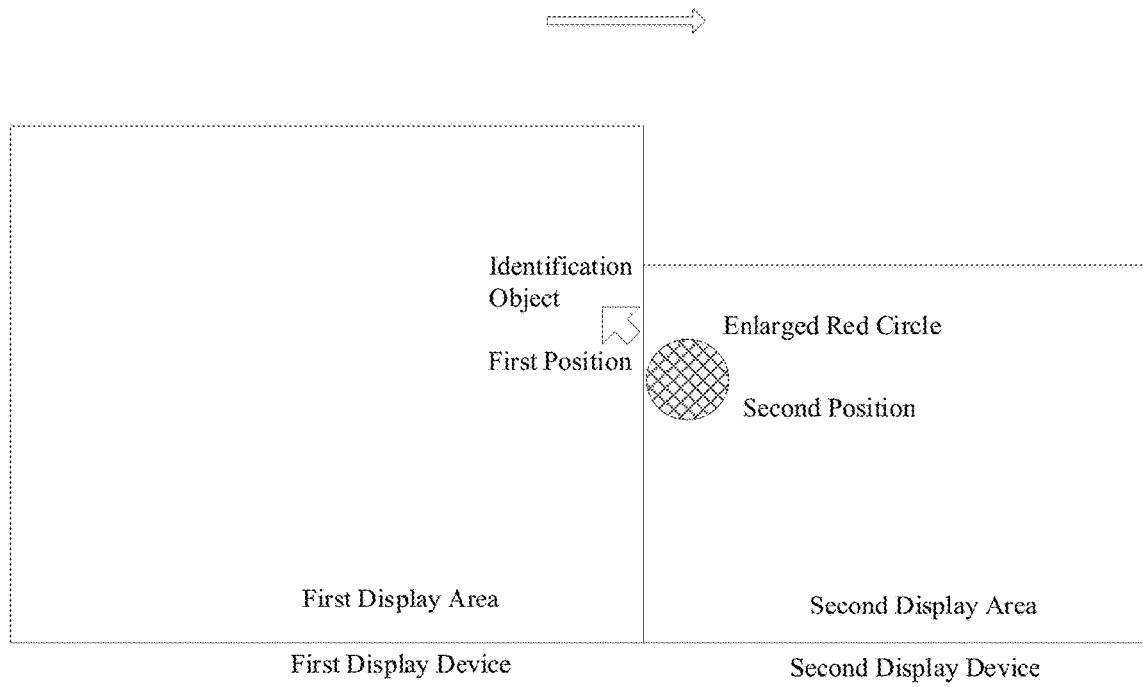
FIGS. 14-18 are other diagrams according to some embodiments of the present disclosure.

That is, in response to the identification object for the identification object, while controlling the movement of the identification object form the first display area to the second display area, the identification object can also be controlled to be prominently output on the second position of the second display area with the target display parameter. In this way, the user of the electronic device can be reminded that the identification object is in the second position of the second display area. As shown in FIG. 14, when the mouse moves from the display screen to the projection screen, the mouse is outputted on the projection screen in the form of an enlarged red circle to achieve the purpose of reminding the user.

In some embodiments, the target type input operation may be any one of an operation in which the number of times the identification object has been moved back and forth exceeds a preset number of movement thresholds, an operation in which the movement distance of the identification object being moved back and forth is greater than or equal to a preset distance threshold, or an operation in which the trajectory of the identification object being moved meets a specific shape. In this way, at least the identification object can be output with the target display parameter at the current position where the identification object is positioned after the target type input operation is performed.

Figure 15:
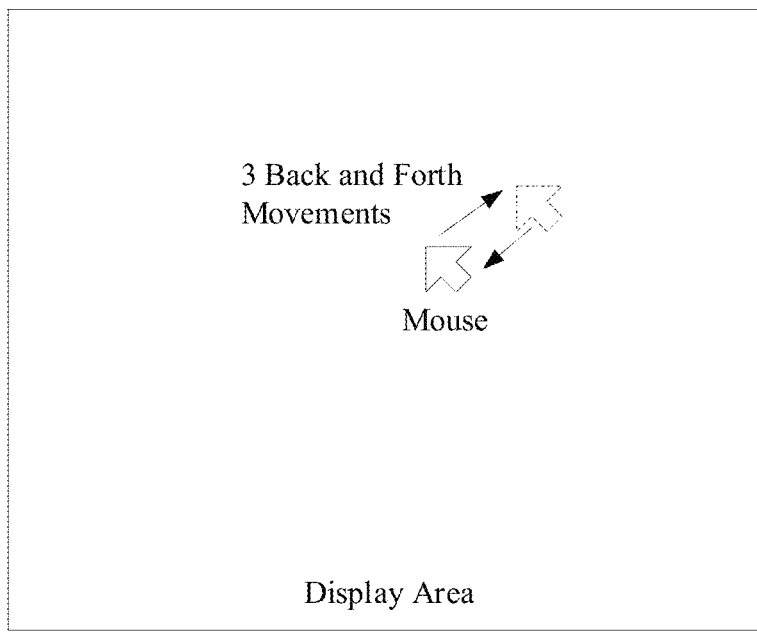
Figure 16:
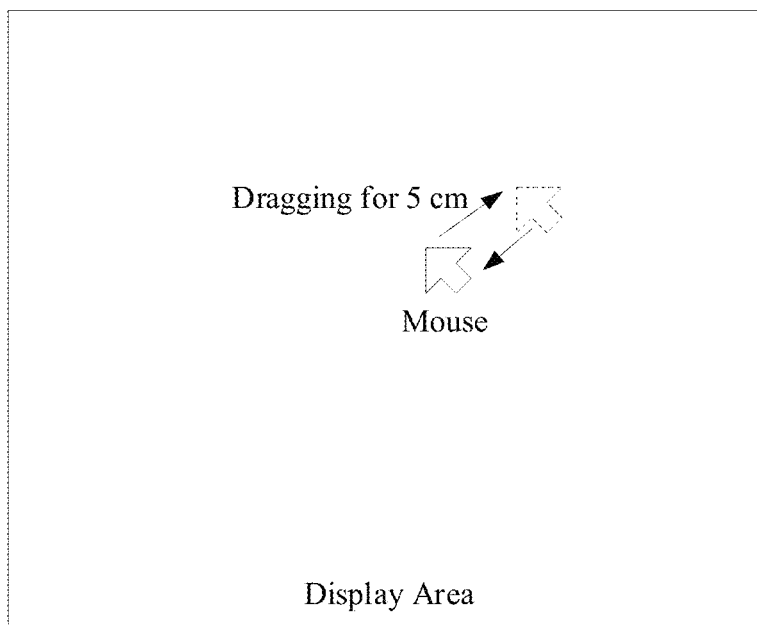
Figure 17:
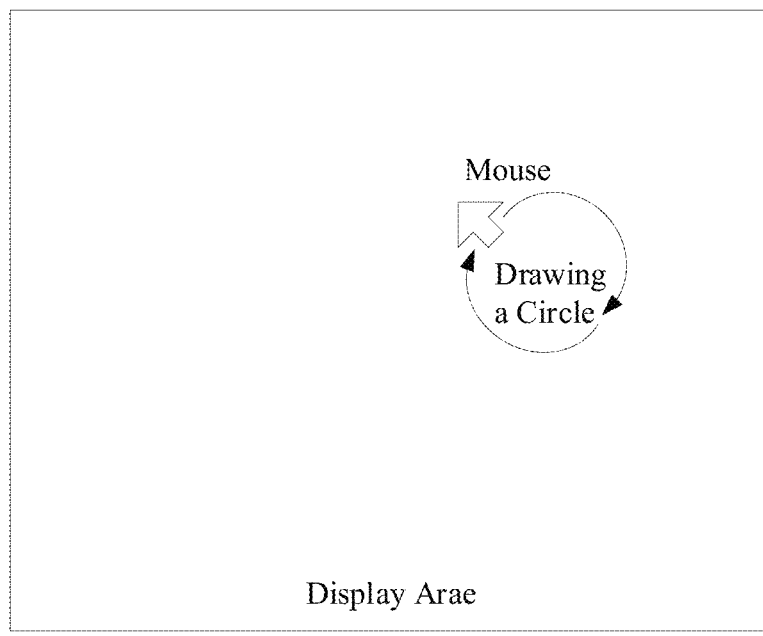

In some embodiments, the operation in which the number of times the identification object has been moved back and forth exceeding the preset number of movement thresholds may be understood as an operation in which the identification object is moved back and forth by the user and the number of movements exceeds the preset number of movement thresholds. For example, FIG. 15 illustrates an input operation in which the mouse is dragged back and forth by the user more than three times. The operation in which the movement distance of the identification object being moved back and forth is greater than or equal to the preset distance threshold may be understood as an operation in which the identification object is moved back and forth by the user and the total distance moved is greater than or equal to the preset distance threshold. For example, FIG. 16 illustrates an input operation in which the mouse is dragged back and forth more than five cm by the user. The operation in which the trajectory of the identification object being moved meets a specific shape may be understood as an operation in which the trajectory of the identification object being moved by the user at least substantially matches a specific shape. For example, FIG. 17 illustrates an input operation in which the mouse is being dragged by the user to draw a circle.

Figure 18:
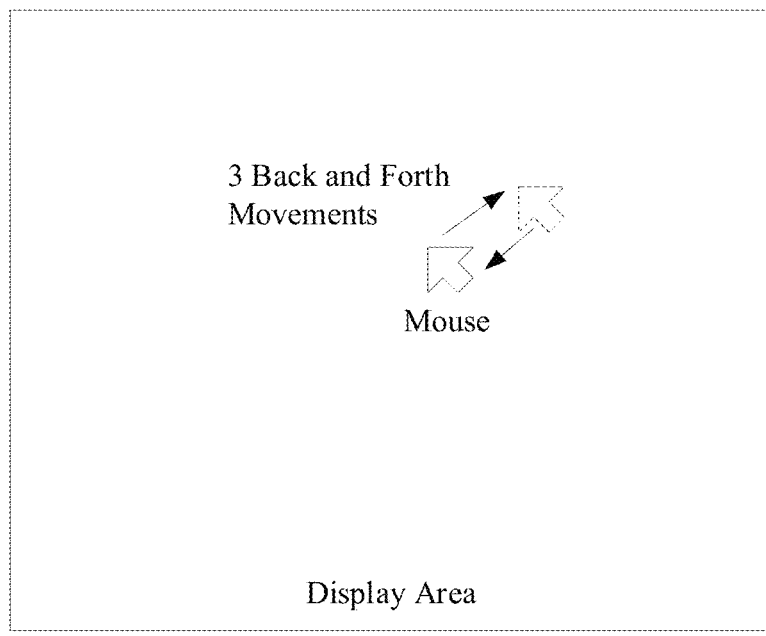
Figure 18:
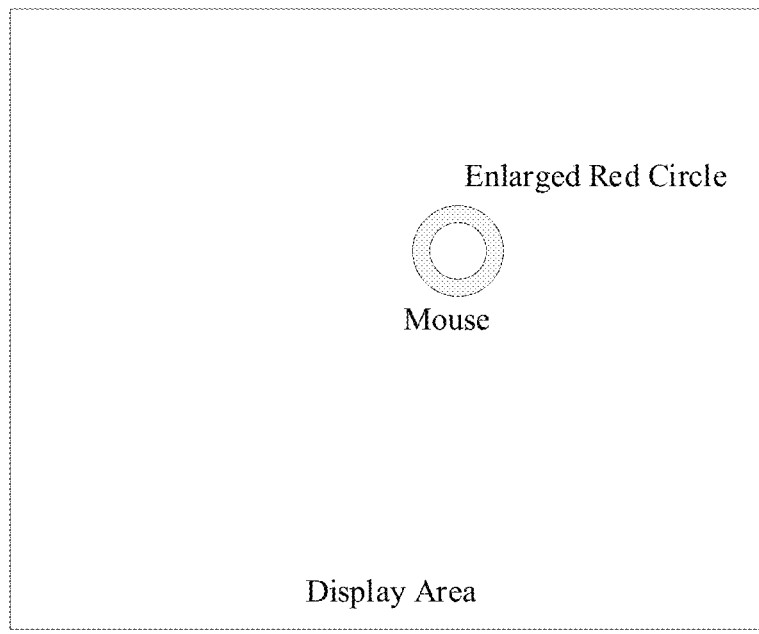

That is, after the first content is outputted in the first display area of the first display device, when any of the foregoing input operation is performed on the identification object, the identification object can be controlled to prominently output the current position of the identification object with the target display parameter. At this time, the identification object may still be in the first display area, or it may be in the process of being controlled to move to the second display area, or it may have been controlled to move from the first display area to the second display area. In this way, the user of the movement instruction can be reminded of the current position of the identification object, such as the first display area or the second display area. As shown in FIG. 18, after the mouse is dragged back and forth three times by the user, the mouse is outputted in the current position of the display screen in the form of an enlarged red circle to achieve the purpose of reminding the user. In particular, the display screen may be the display screen sed as the first display area, or the display screen used as the second display area.

It should be noted that after controlling the identification object to output with the target display parameter, the state and position of the identification object output with the target display parameter may be set for a preset period of time, such as one second or three seconds, etc. Subsequently, the identification object can be controlled to be output with the default display parameter, which can be the display parameter that the identification object has before the target type input operation is performed.

Figure 19:
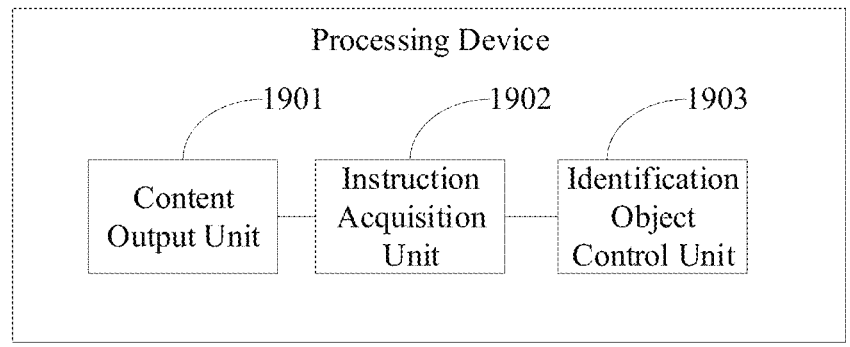
FIG. 19 is a schematic structural diagram of a processing device according to an embodiment of the present disclosure.

FIG. 19 is a schematic structural diagram of a processing device according to an embodiment of the present disclosure. The device may be disposed in electronic devices capable of outputting content and controlling identification objects, such as tablets, laptops, and other devices with display devices, such as display screens. The technical solutions provided in the embodiments of the present disclosure can be used to realize the output of the identification object across display devices.

As shown in FIG. 19, the processing device includes a content output unit 1901. The content output unit 1901 may be configured to output the first content in the first display area of the first display device, the first content containing at least an identification object. The identification object may be on the edge of the first area of the first display area, and the first display area may have a first resolution. The edge of the first area may be an edge area between the first display area and the second display area of the second display device. The processing device further includes an instruction acquisition unit 1902. The instruction acquisition unit 1902 may be configured to receive a movement instruction. The movement instruction may be used to control the movement of the identification object from the first display area to the second display area. In some embodiments, the second display area may have a second resolution, and the first resolution may be higher than the second resolution. In addition, the first display device may be configured to output a first part of a target image in the first display area, the second display device may be configured to output a second part of the target image in the second display area, and the first part and the second part may be at least partially adjacent in the target image. The processing device further includes an identification object control unit 1903. The identification object control unit 1903 may be configured to control the identification object to move from the first position in the first display area to the second position in the second display area in response to the movement instruction, the first position being any position on the edge of the first area.

Consistent with the present disclosure, by using the processing device described in the foregoing embodiment, the first display area and the second display area can respectively output a part of the target image. After the first content is outputted in the first display area of the first display device and the movement instruction for moving the identification object in the first content is received, the identification object can be controlled to move from any position in the first display area with high resolution to the second display area with low resolution, thereby avoiding the situation that the identification object cannot move from the high-resolution display area to the low-resolution display area.

In some embodiments, the first position may be any position on the edge area in the first display area where there is an adjacent position in the second display area. Alternatively, the first position may be any position on the edge area in the first display area where there is no adjacent position in the second display area.

Based on this, when the first position is any position on the edge area in the first display area where there is an adjacent position in the second display area, the second position may be obtained by performing a first processing on the first position through the identification object control unit 1903. Further, when the first position is any position on the edge area in the first display area where there is no adjacent position in the second display area, the second position may be obtained by performing a second processing on the first position through the identification object control unit 1903. In some embodiments, the first processing may be different from the second processing.

In some embodiments, performing the first processing on the first position through the identification object control unit 1903 may include obtaining the second position adjacent to the first position on the edge area of the second display area. Further, performing the second processing on the second position through the identification object control unit 1903 may include obtaining the second position on the edge area in the second display area. The second position may be a position on the edge area in the second display area that is closest to the first position, or, the second position may be a position of the edge vertex corresponding to the first position on the edge area in the second display area.

In some embodiments, obtaining the second position on the edge area in the second display area through the identification object control unit 1903 may include obtaining a plurality of positions on the edge of the first area that are adjacent to the second display area; obtaining a target position with the shortest distance from the first position in the plurality of positions; and obtaining the second position adjacent to the target position on the edge of the second display area.

In some embodiments, the second position may be a position on the edge of the second area adjacent to the first display area in the second display area, and the relative positional relationship of the second position on the edge of the second area may be consistent with the relative positional relationship of the first position on the edge of the first area.

Figure 20:
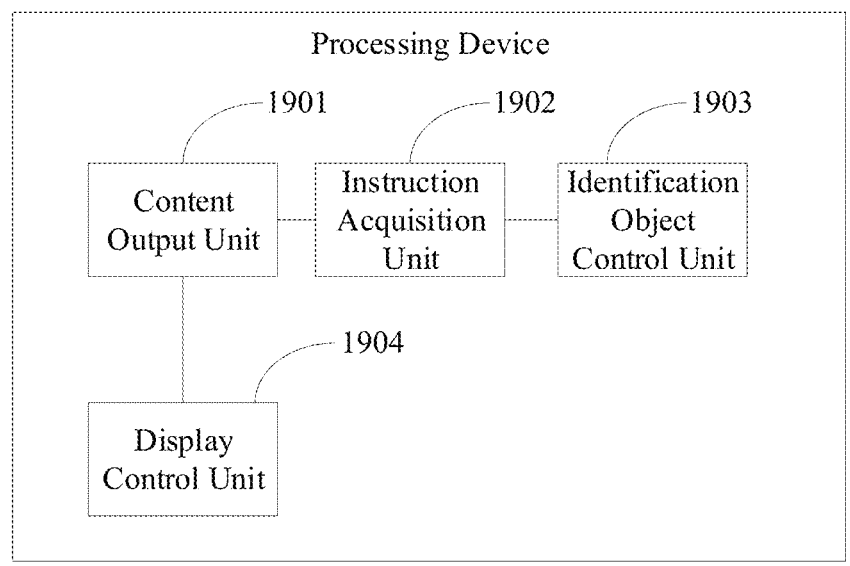
FIG. 20 is a schematic structural diagram of the processing device according to an embodiment of the present disclosure.

In some embodiments, as shown in FIG. 20, the processing device further includes a display control unit 1904. The display control unit 1904 may be configured to monitor whether a target type input operation is performed on the identification object after the content output unit 1901 outputs the first content in the first display area of the first display device, and control the identification object to have at least a target display parameter in response to the target type input operation being performed on the target object. In some embodiments, the target display parameter may be used to prominently output the identification object.

In some embodiments, the target type input operation may include at least an operation of moving the identification object from the first display area to the second display area, such that at least the identification object can be output at the second position with the target display parameter. Alternatively, the target type input operation may include any one of an operation in which the number of times the identification object has been moved back and forth exceeds a preset number of movement thresholds, an operation in which the movement distance of the identification object being moved back and forth is greater than or equal to a preset distance threshold, or an operation in which the trajectory of the identification object being moved meets a specific shape.

In some embodiments, the target display parameter may include one or more of a display size parameter, a display color parameter, and a display shape parameter.

It should be noted that for the specific implementation of each unit in the processing device, reference can be made to the corresponding content in the foregoing embodiments, which will not be repeated here.

Figure 21:
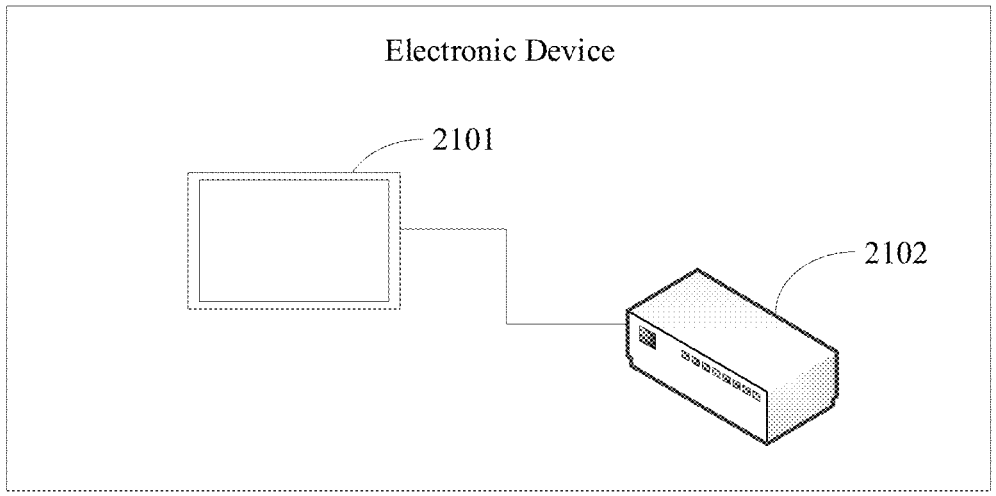
FIG. 21 is a schematic structural diagram of an electronic device according to an embodiment of the present disclosure.

FIG. 21 is a schematic structural diagram of an electronic device according to an embodiment of the present disclosure. The electronic device may be an electronic device capable of outputting content and controlling identification objects, such as a tablet, a laptop, and other devices with display devices, such as display screens. The technical solutions provided in the embodiments of the present disclosure can be used to realize the output of the identification object across display devices.

As shown in FIG. 21, the electronic device includes a first display device 2101. In some embodiments, the first display device 2101 may include a first display area, such as a display screen with a display area, etc. The electronic device further includes a processor 2102. The processor 2102 may be configured to output the first content in the first display area, the first content including at least an identification object. The identification object may be on the edge of the first area of the first display area, and the first display area may have a first resolution. The edge of the first area may be an edge area between the first display area and the second display area of the second display device. The processor 2102 may be further configured to receive a movement instruction. The movement instruction may be used to control the movement of the identification object from the first display area to the second display area. In some embodiments, the second display area may have a second resolution, and the first resolution may be higher than the second resolution. In addition, the first display device may be configured to output a first part of a target image in the first display area, the second display device may be configured to output a second part of the target image in the second display area, and the first part and the second part may be at least partially adjacent in the target image. The processor 2102 may be further configured to control the identification object to move from the first position in the first display area to the second position in the second display area in response to the movement instruction, the first position being any position on the edge of the first area.

In addition, the electronic device may also include a memory, a communication module, and other parts to implement the corresponding functions. In some embodiments, the memory may store application programs and data generated by the application programs. Based on this, the processor 2102 can execute the application programs stored in the memory to realize the content output and cross-area control of the identification object.

Consistent with the present disclosure, by using the electronic device described in the foregoing embodiment, the first display area and the second display area can respectively output a part of the target image. After the first content is outputted in the first display area of the first display device and the movement instruction for moving the identification object in the first content is received, the identification object can be controlled to move from any position in the first display area with high resolution to the second display area with low resolution, thereby avoiding the situation that the identification object cannot move from the high-resolution display area to the low-resolution display area.

The technical solutions in the embodiments of the present disclosure will be described below by taking the mouse as an example.

When using a computer, users often encounter a situation where the mouse pointer (generally an arrow) cannot be located. When there are multiple screens, there are situations where the mouse cannot be moved from one screen to another. These situations generally occur in scenarios where the resolution of two adjacent screens is not the same or the two screens are not logically aligned in the operating system.

In order to improve the situations described above, embodiments of the present disclosure provide the following technical solutions.

First, for the situation where the mouse pointer cannot be located, one or more mouse actions (that is, the target type input operation described above) may be predefined, and based on this, the mouse may be positioned. The one or more mouse actions may be referred to as the mouse positioning actions. Based on this, an application program can be written, and the application program can be embedded in the operating system to monitor mouse events in the operating system. The application program may be referred to as the mouse assistance software, which can analyze mouse movements in real time during process of monitoring mouse events. Once a mouse positioning action is identified, the mouse point can be displayed in a striking way, such as temporarily zooming in on the mouse pointer, changing the shape of the mouse pointer, changing the color of the mouse pointer, etc.

In this way, when the user cannot locate the mouse or when the mouse is hidden, a defined mouse action can be performed on the mouse to locate the mouse. Further, a good mouse positioning action can make users get used to it naturally, without special training.

In addition, for the situation where the mouse cannot move across screens, in a scenario where multiple screens are being used, the mouse assistance software may be implemented to obtain the coordinate position of each screen and monitor the mouse events in real time. When the mouse assistance software monitors detects that the mouse is about to move out of a certain screen boundary, if the point outside the boundary of the moving direction is not within a certain screen area, other screen areas adjacent to the screen boundary where the mouse is currently located may be quickly located, and the screen area closest to the current mouse position may be selected. Subsequently, the mouse may be moved to the selected screen area, and the mouse pointer may be prominently displayed (such as temporarily zooming in or changing the shape, color, etc. of the mouse pointer).

In this way, when the user operates the mouse to cross the boundary, the mouse can cross over without being blocked, which improves work efficiency and the user experience under multi-screen conditions. In addition, by prominently displaying the mouse pointer at the same time, the user can clear know how the mouse crosses the screen and the current position of the mouse.

Figure 22:
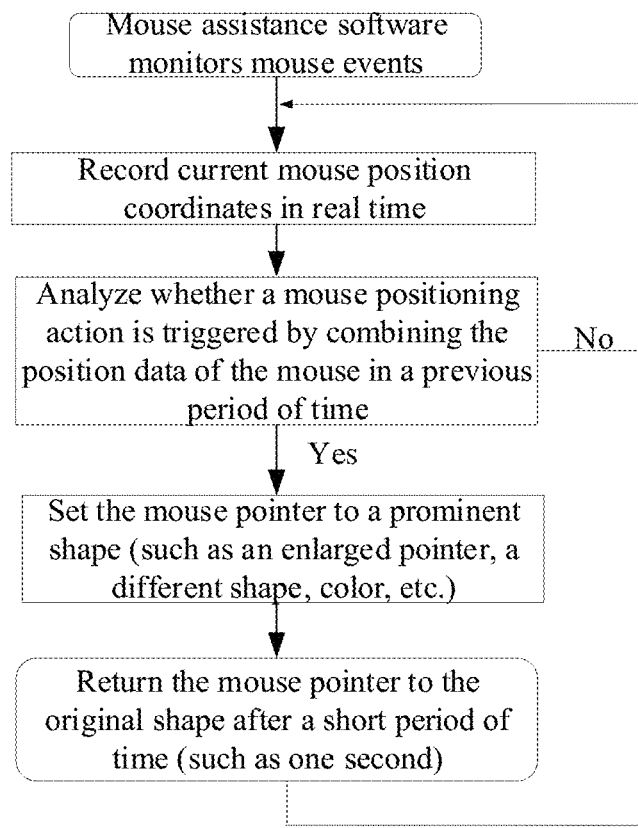
FIGS. 22-23 are flowcharts of mouse positioning and cross-screen control in mouse movement control scenarios.

FIG. 22 is a flowchart for the implementation of positioning the mouse.

At first, the mouse assistance software is used to monitor mouse events and record the current mouse position coordinates in real time. Next, combined with the position data of the mouse in a previous period of time, whether the mousing positioning action is triggered can be analyzed. If the analysis finds that the mouse positioning action is triggered, the mouse pointer may be set to a prominent shape, such as zooming in on the mouse pointer, changing the shape of the mouse pointer, and changing the color of the mouse pointer. Further, after maintaining the display of the mouse pointer for a short period of time (such as one second), the mouse pointer may be restored to its original shape, and then the returned to continue recording the current mouse position coordinates in real time, and continue the mouse positioning.

In addition, if the analysis finds that eh mouse positioning action is not triggered, then the process can be returned to continue recording the current position coordinates of the mouse in real time, and continue the mouse positioning.

It should be noted that many methods can be used to analyze whether the mouse positioning action is triggered, such as shaking the mouse quickly, moving the mouse to draw a circle, pressing any button of the mouse many times in a short period of time, etc.

In some embodiments, shaking the mouse quickly may be that in a short period of time, the direction of the mouse has changed multiple times, or the total movement distance exceeds a threshold. Further, two or more of these conditions can be used as an action to trigger the mouse positioning. For example, the mouse moves left and right four times within 400 milliseconds, the mouse moves left and right three times within 300 milliseconds, or the total movement distance of left and right movement exceeds 2000 pixels, can be considered that the mouse positioning action is triggered.

Figure 23:
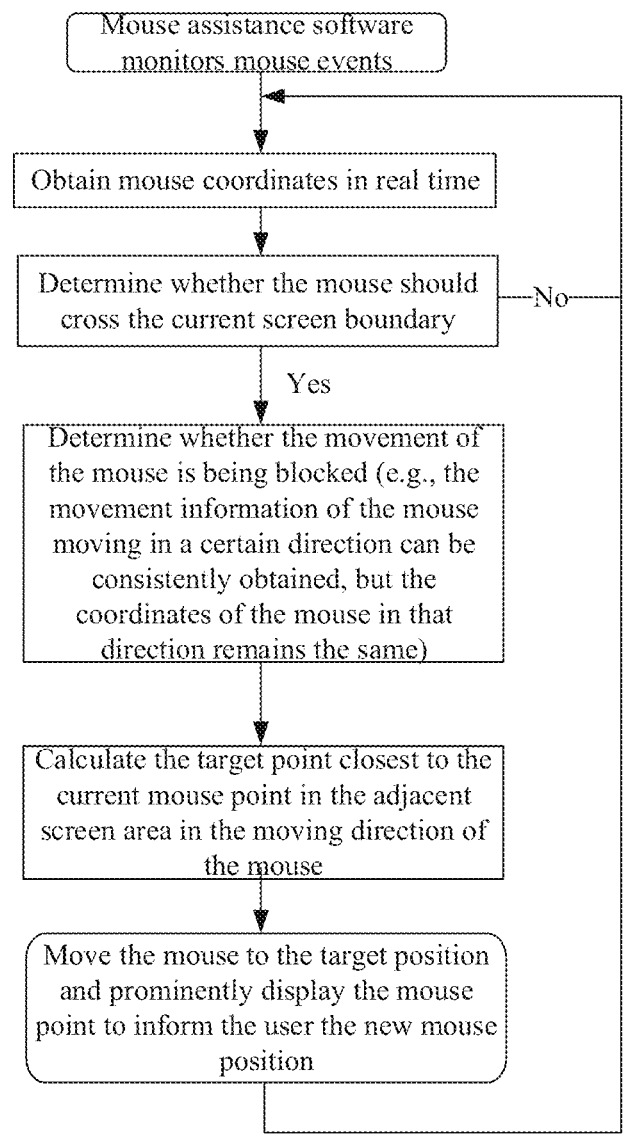
Figure 24:
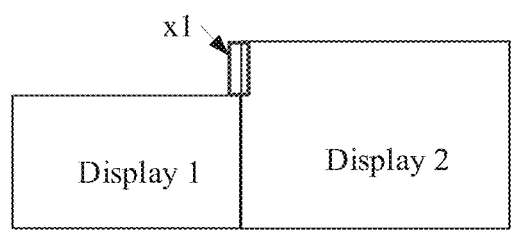
FIGS. 24-25 are diagrams of different resolutions and misalignment between two displays according to some embodiments of the present disclosure.
Figure 25:
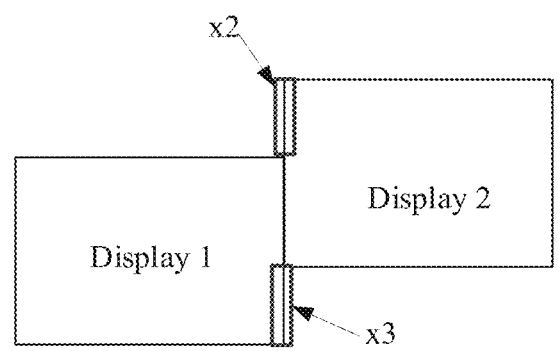

FIG. 23 is a flowchart for the implementation of automatically controlling the mouse to move across screens. The mouse may be blocked when moving across screens when the resolution of the two screens is different, or the two screens are not aligned. For scenarios where the screens are not aligned, reference can be made to FIG. 24 and FIG. 25. As shown in FIG. 24, the edge between display 2 and display 1 has a partial edge x1 that is not adjacent to the display 1, and the resolutions of the display 2 and the display 1 are different. As shown in FIG. 25, the edge between the display 2 and the display 1 has a partial edge x2 that is not adjacent to display 1, and the edge between the display 1 and the display 2 has a partial edge x3 that is not adjacent to the display 2.

Based on the scenarios shown in FIG. 24 and FIG. 25, when the mouse appears in the boundary area x1, x2, or x3 enclosed by the border, the mouse will be blocked when it crosses the screen. Therefore, at this time, whether there is a screen adjacent to the current screen boundary may need to be determined. If there is a screen adjacent to the current screen boundary, a target point closest to the current mouse point in the adjacent can be calculate to move the mouse across.

It should be noted that the scenarios shown in FIG. 24 and FIG. 25 are examples of the horizontal arrangement of adjacent displays. The adjacent displays can also be arranged vertically, but the method of calculating the closest target point in the adjacent screen is the same.

In some embodiments, the implementation process of controlling the mouse to automatically cross screen may be as follow.

First, the mouse assistance software may be used to locate the mouse by monitoring mouse events, and at the same time obtain the mouse coordinates in real time, and then determine whether the mouse should cross the current screen boundary.

When it is determined that the mouse is going to cross the current screen boundary, whether the movement of the mouse is blocked may be determined. For example, in the operating system, if the input operation of the mouse moving in a certain direction can be consistently obtained, but the coordinates of the mouse in that direction remains the same, at this time, the movement of the mouse can be considered as being blocked.

When it is determined that the movement of the mouse is being blocked, the target point closest to the current mouse point in the adjacent screen in the movement direction of the mouse can be determined. At this time, the mouse can be moved to the target point and the mouse pointer can be prominently displayed such that the user can notice the new position of the mouse. Subsequently, the process may return to obtaining the mouse coordinates to continue the mouse cross-screen control.

In addition, when it is determined that the mouse does not need to cross the current screen boundary, the process may be returned to continue to obtain the mouse coordinates to continue the mouse cross-screen control.

It should be noted that the process of determining whether the movement of the mouse is being blocked may be an optional process. In the scenarios where this process is performed, the mouse may be automatically moved across the screen where the mouse movement is blocked, and the user may be reminded with the position of the mouse. In the scenarios where this process is not performed, in all the places where the mouse crosses the screen, the mouse may be automatically moved across screen, and the user may be reminded with the position of the mouse.

In the present specification, the embodiments are described in a gradual and progressive manner with the emphasis of each embodiment on an aspect different from other embodiments. The same or similar parts among the various embodiments may refer to each other. Since the disclosed device embodiment corresponds to the disclosed method embodiment, detailed description of the disclosed device is omitted, and reference can be made to the description of the methods for a description of the relevant parts of the device.

As will be appreciated by those of ordinary skill in the art, the embodiments disclosed herein can be implemented by way of electronic hardware, computer software, or a combination of the two. To clearly illustrate the interchangeability between hardware and software, components and steps of respective examples have already been described in a general way in terms of functions in the above description. These functions are to be executed by hardware manner or software manner depending upon the particular application of the technique process and design constraints. Those skilled in the art can use different methods to achieve the described functions with respect to each specific application, but such implementation should not be construed as going beyond the scope of the present disclosure.

The processes of the methods or algorithms described in conjunction with the embodiments of the present disclosure can be implemented with hardware, software modules executed by a processor, or a combination thereof. The software modules may reside in a random-access memory (RAM), an internal memory, a read-only memory (ROM), an electrically programmable ROM, an electrically-erasable programmable ROM, a register, a hard disk, a removable disk drive, CD-ROM, or other types of storage media well known in the technical field.

The foregoing description of the disclosed embodiments will enable a person skilled in the art to realize or use the present disclosure. Various modifications to the embodiments will be apparent to those skilled in the art. The general principles defined herein may be implemented in other embodiments without departing from the spirit or scope of the disclosure. Accordingly, the disclosure will not be limited to the embodiments shown herein, but is to meet the broadest scope consistent with the principles and novel features disclosed herein.

What is claimed is:

1. A processing method for displaying an identification object, comprising:
    outputting first content in a first display area of a first display device, the first content including an identification object located on an edge of a first area of the first display area, the first area having a first resolution, the edge of the first area being an edge area between the first display area and a second display area of a second display device;
    obtaining a plurality of positions of the identification object near the edge of the first area where there is no adjacent position in the second display area;
    obtaining a first position among the plurality of positions, the first position being an end position of a movement trajectory of the identification object on the first display area;
    obtaining a target position on the edge of the first area having a shortest distance from the first position and is adjacent to the second display area;
    obtaining the second position adjacent to the target position on the edge of the second display area;
    receiving a movement instruction for moving the identification object from the first display area to the second display area, wherein the second display area has a second resolution and the first resolution is higher than the second resolution, the first display device outputs a first part of a target image in the first display area, the second display area outputs a second part of the target image in the second display area, and the first part and the second part are at least partially adjacent in the target image; and
    moving the identification object from the first position in the first display area to a second position in the second display area in response to the movement instruction, the first position being a position on the edge of the first area.

2. The method of claim 1, wherein:
    performing a first processing on the first position includes obtaining the second position adjacent to the first position on an edge of the second display area; and
    performing a second processing on the first position includes obtaining the second position on the edge of the second display area, the second position being a position on the edge of the second display area that is closest to the first position or an edge vertex position corresponding to the first position on the edge of the second display area.

3. The method of claim 1, wherein:
the second position is a position on the edge of the second area adjacent to the first display area in the second display area, and a relative positional relationship of the second position on the edge of the second area is consistent with a relative positional relationship of the first position on the edge of the first area.

4. The method of claim 1, after outputting the first content in the first display area of the first display device further comprising:
   determining whether a target type input operation is performed on the identification object; and
   including in the identification object with one or more target display parameters in response to the target type input operation is performed, the target display parameters being used to prominently output the identification object.

5. The method of claim 4, wherein the target type input operation includes one or more of:
   an operation of moving the identification object from the first display area to the second display area to output the identification object at the second position with the target display parameter; or,
   an operation in which a number of times the identification object is moved back and forth exceeding a preset number of movement thresholds; or,
   an operation in which a movement distance of the identification object being moved back and forth is greater than or equal to a preset distance threshold; or,
   an operation in which a trajectory of the identification object being moved meets a specific shape, the target display parameters including one or more of a display size parameter, a display color parameter, and a display shape parameter.

6. An electronic device for displaying an identification object, comprising:
   a first display device, the first display device having a first display area; and
   a processor configured to
   output first content in the first display area, the first content including an identification object located on an edge of a first area of the first display area, the first area having a first resolution, the edge of the first area being an edge area between the first display area and a second display area of a second display device;
   obtain a plurality of positions of the identification object near the edge of the first area where there is no adjacent position in the second display area;
   obtain a first position among the plurality of positions, the first position being an end position of a movement trajectory of the identification object on the first display area;
   obtain a target position on the edge of the first area having a shortest distance from the first position and is adjacent to the second display area;
   obtain the second position adjacent to the target position on the edge of the second display area;
   receive a movement instruction, the movement instruction for moving the identification object from the first display area to the second display area, wherein the second display area has a second resolution and the first resolution is higher than the second resolution, the first display device outputs a first part of a target image in the first display area, the second display area outputs a second part of the target image in the second display area, and the first part and the second part are at least partially adjacent in the target image; and to an historical activity area of the touch operation based on the operation information; and
   move the identification object from the first position in the first display area to a second position in the second display area in response to the movement instruction, the first position being a position on the edge of the first area.

7. The electronic device of claim 6, wherein:
performing a first processing on the first position includes obtaining the second position adjacent to the first position on an edge of the second display area; and
performing a second processing on the first position includes obtaining the second position on the edge of the second display area, the second position being a position on the edge of the second display area that is closest to the first position or an edge vertex position corresponding to the first position on the edge of the second display area.

8. The electronic device of claim 6, wherein:
the second position is a position on the edge of the second area adjacent to the first display area in the second display area, and a relative positional relationship of the second position on the edge of the second area is consistent with a relative positional relationship of the first position on the edge of the first area.

9. The electronic device of claim 6, after outputting the first content in the first display area of the first display device, the processor is further configured to:
   determine whether a target type input operation is performed on the identification object; and
   include in the identification object with one or more target display parameters in response to the target type input operation is performed, the target display parameters being used to prominently output the identification object.

10. The electronic device of claim 9, wherein the target type input operation includes one or more of:
   an operation of moving the identification object from the first display area to the second display area to output the identification object at the second position with the target display parameter; or,
   an operation in which a number of times the identification object is moved back and forth exceeding a preset number of movement thresholds; or,
   an operation in which a movement distance of the identification object being moved back and forth is greater than or equal to a preset distance threshold; or,
   an operation in which a trajectory of the identification object being moved meets a specific shape, the target display parameters including one or more of a display size parameter, a display color parameter, and a display shape parameter.

* * * * *